United States Patent [19]
Allington

[11] 3,737,758
[45] June 5, 1973

[54] SWITCH-MODE VOLTAGE AND CURRENT REGULATOR

[76] Inventor: Robert W. Allington, 1551 Ridgeway, Lincoln, Nebr. 68506

[22] Filed: Nov. 3, 1971

[21] Appl. No.: 195,519

Related U.S. Application Data

[63] Continuation of Ser. No. 64,094, July 28, 1970, which is a continuation of Ser. No. 771,521, Oct. 29, 1968.

[52] U.S. Cl. .................................................. 321/18
[51] Int. Cl. .............................................. H02m 7/00
[58] Field of Search .................. 321/15, 18, 45 DT; 323/22 SC

[56] References Cited
UNITED STATES PATENTS

| | | |
|---|---|---|
| 3,289,069 | 11/1966 | Todd .................................. 321/18 |
| 3,337,787 | 8/1967 | Joseph ............................. 321/15 X |
| 3,202,900 | 8/1965 | McGivern, Jr. ..................... 320/39 |
| 3,270,270 | 8/1966 | Yenisey ............................... 321/18 |
| 3,356,927 | 12/1967 | Barron ................................ 321/18 |
| 3,372,326 | 3/1968 | Stefanov ............................. 321/24 |
| 3,533,010 | 10/1970 | Bowles .......................... 321/15 X |

Primary Examiner—William M. Shoop, Jr.
Attorney—Vincent L. Carney

[57] ABSTRACT

An alternating current input to direct current output power supply providing a regulated constant voltage or constant current output and incorporating a switching-mode preregulator and a postregulator. Regulation is primarily obtained by means of a bidirectional switching element operated at a relatively low voltage and the alternating current voltage output from the switching element and an associated power transformer is applied to a rectifying voltage multiplier to produce a high voltage output. A series-pass output regulator, is controlled by negative feedback derived from the output circuitry and negative feedback from such regulator controls the switching element.

15 Claims, 1 Drawing Figure

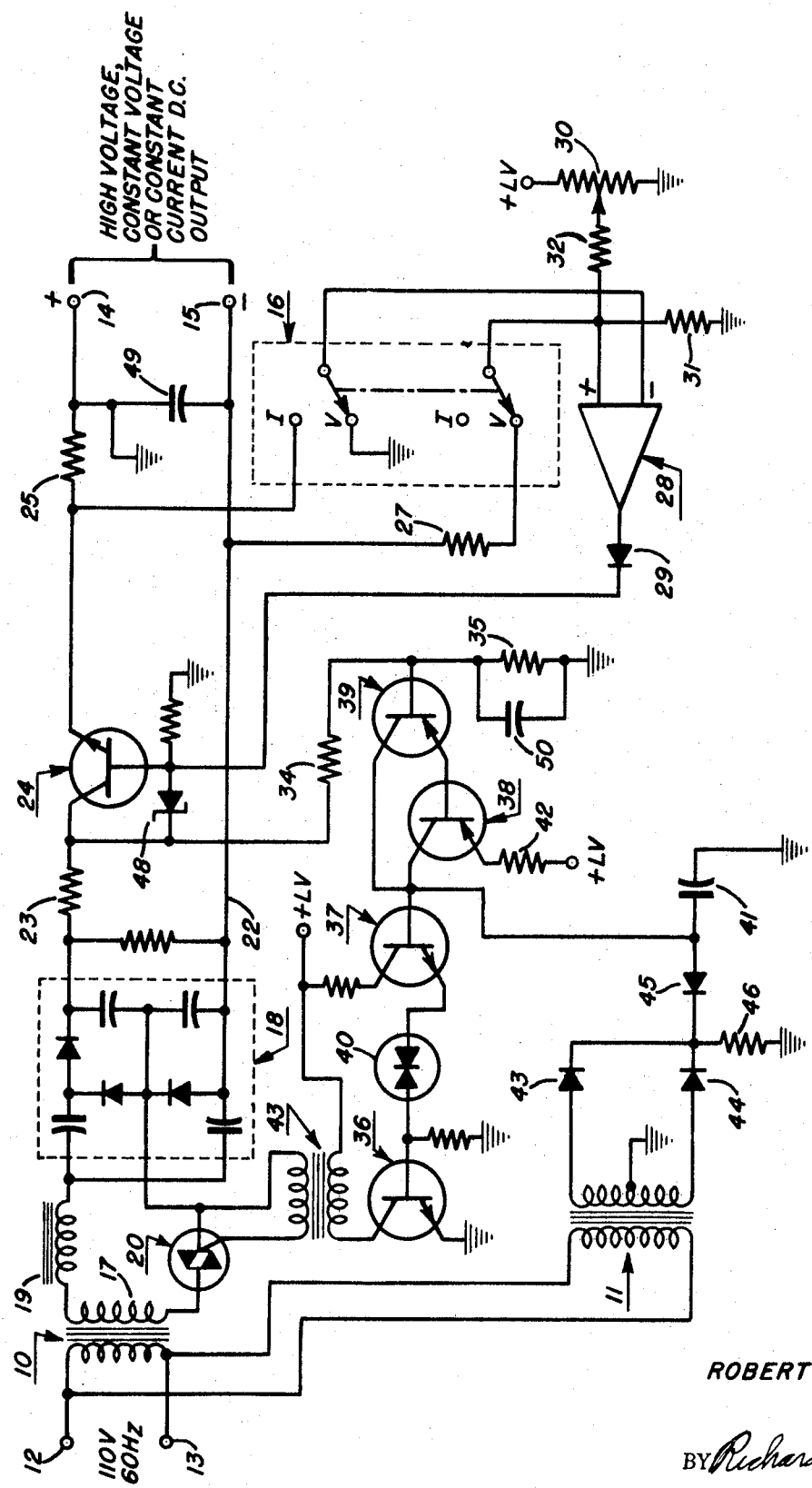
ROBERT W. ALLINGTON
INVENTOR.
BY Richards and Cifelli
ATTORNEYS

SWITCH-MODE VOLTAGE AND CURRENT REGULATOR

This application is a continuation of application Ser. No. 64,094, filed on July 28, 1970, which is a continuation of application Ser. No. 771,521 filed Oct. 29, 1968.

BACKGROUND OF THE INVENTION

The invention relates to a voltage-current regulator of the switching-mode class. Generally, switching-mode regulators have the advantage of higher efficiency than series-pass or other similar regulators that use a variable power-absorbing element.

High voltage regulated power supplies have been difficult to build because of the unavailability, scarcity or high price of suitable high voltage semiconductor elements such as transistors or silicon controlled rectifiers. Conventional switching-mode regulated power supplies use unidirectional switching devices, such as single-connected silicon controlled rectifiers, which operate at circuit potentials higher than the final output potential of the power supply. For relatively high voltage power supplies, having an output of, say, 1000 volts, the silicon controlled rectifiers must be capable of operating at potentials considerably in excess of 1000 volts. Such rectifiers are expensive. Furthermore, a voltage multiplier cannot readily be used in switching-mode circuits incorporating a single silicon controlled rectifier. Consequently, conventional power supplies using semi-conductor elements have a troublesome limitation on their maximum possible output voltage in order to prevent damage to the semi-conductor element.

A non-obvious defect of switching-mode, feedback, voltage regulators is that they have poorer stability than continuous current mode regulators. This is because the current flows through the switching means in sudden, full-current bursts and such sudden bursts of power in the feedback circuit deteriorate its stability. When a voltage multiplier is coupled to a switching-mode regulator the stability is improved as it takes two or more halves of an alternating current half cycle for the output of the switching-mode regulator and voltage multiplier combination to build up to full power. This is because such half cycle charges some, but not all, of the capacitors in the voltage multiplier circuit and two or more half cycles are required to charge all of the capacitors. The result is that the addition of the voltage multiplier provides not only voltage multiplication but, also, a more smooth and gradual modulation of power.

In a high voltage regulated power supply made in accordance with this invention, the primary regulating element is a bidirectional switching element operated at a relatively low voltage, said switching element controlling the voltage applied to a rectifying voltage multiplier, thereby providing a high direct current voltage output. The use of the bidirectional switching element makes it possible to separate the functions of regulation and rectification, thereby resulting in a stable, economical, high voltage, regulated power supply.

SUMMARY OF THE INVENTION

A phase-controlled bidirectional thyristor is connected between a source of alternating current voltage and a rectifying voltage multiplier, said thyristor and multiplier constituting a switching-mode preregulator. The output junctions of the voltage multiplier are connected to the output terminals of the power supply through a series-pass postregulator controlled by negative feedback derived from the output circuitry. Manually operable switching means are provided to condition the power supply for operation either at a constant voltage output or a constant current output, and the magnitude of the d.c. voltage appearing at the output terminals of the power supply can be varied from zero to maximum by adjusting the magnitude of an off-set potential introduced into the feedback circuit.

An object of this invention is the provision of an improved high voltage regulated power supply.

An object of this invention is the provision of a high voltage regulated power supply of the switching-mode class wherein the switching function is separated from the rectifying function.

An object of this invention is the provision of a high voltage regulated power supply of the switching-mode class, wherein regulation is primarily accomplished by means of a bidirectional switching element controlling the magnitude of an alternating current voltage applied to a rectifying voltage multiplier, and wherein regulation of the voltage across the output terminals of the power supply is effected by means of a negative feedback voltage applied to a postregulator stage connected between the voltage multiplier and output terminals.

An object of this invention is the provision of a high voltage regulated power supply of the switching-mode class having a preregulator comprising a phase-controlled, bidirectional thyristor connected between a rectifying voltage multiplier and a power transformer, a series-pass postregulator state connected between the voltage multiplier and the output terminals of the power supply, and a direct current amplifier coupled to the output circuitry of the power supply and applying a negative feed-back voltage to the postregulator shape.

The above-stated and other objects and advantages of the invention will become apparent from the following description when taken with the accompanying drawing. It will be understood, however, that the drawing is for purposes of illustration and is not to be construed as defining the scope of limits of the invention, reference being had for the latter purpose to the claims appended hereto.

BRIEF DESCRIPTION OF THE DRAWING

The single FIGURE of the drawing is a circuit diagram of a high voltage, regulated power supply made in accordance with this invention.

DESCRIPTION OF THE PREFERRED EMBODIMENT

Referring now to the drawing, the primary windings of the transformers 10 and 11 are energized by a source of alternating current voltage connected to the circuit input terminals 12 and 13, and the circuit operates to provide a regulated, constant voltage or a constant current at the output terminals 14 and 15. A double-pole, double-throw switch 16 is positionable in one or the other position to condition the circuit for either constant voltage or constant current operation, as will be described hereinbelow. It is here pointed out that the terminals having associated therewith the legends +LV and −LV are connected to a conventional constant voltage source of some convenient potential such as 15 volts, a potential of +15 volts above zero or ground potential appearing at the terminals marked +LV and a potential of −15 volts below ground or neutral potential appearing at the terminals marked −LV. The secondary winding 17, of the power transformer 10, is connected to the input junctions of a voltage multiplier 18 through a phase-controlled bidirectional thyristor 20. As shown, the voltage multiplier is a full wave voltage quadrupler, but it will be apparent that other types of voltage multipliers, such as voltage doublers, triplers, etc., can be used. One output junction of the voltage quadrupler is connected directly to the output terminal 15 by the lead 22, whereas the other output junction is connected to the output terminal 14 through the resistor 23, transistor 24 and resistor 25.

The transistor 24 is used as a series-pass output regulator stage to improve the primar regulation of the switching-mode preregulator stage comprising the bidirectional thyristor 20 and the voltage quadrupler 18. The switch 16 is operable to select either a constant voltage or a constat current regulated output. When the switch is positioned in the illustrated V position the power supply provides a regulated constant voltage direct current output. When the switch is positioned in the I position, the power supply functions to provide a regulated constant current direct current output. For constant voltage operation, regulation is obtained by negative voltage feedback through the coupling resistor 27, direct current amplifier 28, coupling diode 29 and the series-pass transistor 24. The voltage output of the power supply may be adjusted from zero to maximum by introducing an offset voltage to the amplifier by means of the potentiometer 30 and a voltage divider formed of the resistors 31 and 32, said potentiometer being connected across the 15 volt constant voltage source. For constant current operation, negative current feedback is supplied by means of the voltage appearing across the current-sensing resistor 25, which voltage is amplified by the amplifier and coupled by the diode 29 to the series-pass transistor 24. The output current may be varied from zero to maximum by means of the offset voltage obtained from the potentiometer 30. For practical reasons, it is desirable that the series-pass transistor 24 operate at a maximum potential of less than 100 volts, and the switching-mode preregulator stage functions to maintain the potential on the collector of the transistor 24 at some convenient potential less than 100 volts, such as 60 volts. This is accomplished by taking the voltage on the collector and applying it, through the voltage divider resistors 34 and 35, in a negative feedback manner to provide phase-control of the bidirectional thyristor 20.

The phase control circuit for the bidirectional thyristor 20 incorporates the transistors 36, 37, 38 and 39 and the four-layer diode 40. The voltage on the collector of the seriespass transistor 24 is determined by the ratio of the voltage divider resistors 34, 35 and the magnitude of the biasing potential +LV applied to the emitter of the transistor 38 through the resistor 42. When the potential applied to the base of the transistor 39 drops below the desired value, the potential applied to the base of the transistor 39, through the voltage divider 34, 35, will drop. This causes the transistors 38 and 39 to conduct, whereby current flows through the resistor 42 and the transistors 38, 39, thereby charging the capacitor 41. Approximately this same potential will appear on the emitter of the transistor 37, by emitter follower action. When this potential rises above the breakdown potential of the four-layer diode 40, such diode will suddenly permit a pulse of current to flow which will cause the transistor 36 to conduct, thereby causing current to flow through the primary winding of the pulse transformer 43. The resulting potential developed in the secondary winding of the pulse transformer causes the bidirectional thyristor 20 to suddenly turn on, and the tyristor will remain in the turned-on state until the end of the alternating current half cycle of the voltage developed in the secondary winding of the power transformer 10. The effective alternating current input voltage applied to the voltage quadrupler 18 depends upon the conduction angle of the phase-controlled, bidirectional thyristor 20. The lower the potential on the collector of the series-pass transistor 24 is from the desired value, the faster will the capacitor 41 charge and the sooner will the thyristor conduct. This increases the effective average alternating current voltage which is applied to the voltage multiplier supplying power to the collector of the transistor 24, thereby tending to maintain the collector of this transistor at a constant voltage.

The diodes 43, 44, 45 and the resistor 46 comprise a resetting circuit to reset the charge and the integrated potential on the capacitor 41 to zero at the end alternating current half cycle. the diodes 43 and 44 conduct and provide a reverse bias on the diode 45 during most of each alternating current half cycle. When the potential of the secondary of the transformer 11 drops to zero, as it does at the end of every alternating current half cycle, the diodes 43, 44 stop conducting and the charge on the capacitor 41 is very rapidly dissipated by means of current flow through the diode 45 and the resistor 46.

The inductor 19, which may be a separate inductor or may be incorporated in the leakage inductance of the transformer 10, limits the maximum current flow charging the capacitors of the voltage multiplier 18 at the instant that the thyristor 20 begins to conduct. This improves the efficiency and stability of the circuit. The resistor 23 protects the series-pass transistor 24 as such resistor limits the current flow through the transistor during inadvertent short circuit output conditions. A zener diode 48 is connected between the base and the collector of the transistor 24. This diode conducts when the collector to base potential of the transistor reaches an otherwise dangerously high value, thereby preventing destruction of the transistor if the output of the power supply is accidentally short circuited. The capacitor 49, connected across the output terminals, improves the stability of the series-pass postregulator stage and decreases interference in the output circuit at the instant that the thyristor conducts, whereas the capacitor 50, connected across the resistor 35, improves the stability of the preregulator circuit.

The drawing illustrates a simplified circuit diagram. It will be apparent to those skilled in this art that bidirectional switching-mode devices other than the illustrated bidirectional thyristor can be used, such as dual, back-to-back coupled silicon controlled rectifiers, transistors, etc., and that various additional means can be added to the circuit to improve regulation, stability and ability to withstand overloads.

Having now described the invention those skilled in this art will be able to make various changes and modi- fications without thereby departing from the spirit and scope of the invention as recited in the following claims.

I claim:

1. A power supply having a power-supply input adapted to receive a series of alternating half cycles of alternating current electrical energy and a power-supply output adapted to supply direct current electrical energy to a load, comprising:

switching means having a switching-means control terminal, a switching-means output terminal and a switchingmeans input terminal for blocking first portions and passing second portions of said alternating half cycle of alternating current electrical energy between said switching-means input terminal and said switching-means output terminal, for increasing the first portions and decreasing the second portions when a characteristic of a control signal applied to the switching means control terminal changes in a first direction and for decreasing the first portions and increasing the second portions when said characteristic changes in a second direction;

switching-control feedback means, having a feedback output electrically connected to said switching-means control terminal and having a feedback input, for causing said characteristic of said control signal to change in said first direction when one parameter of said direct current electrical energy at said feedback input increases and for causing said characteristic of said control signal to change in said second direction when said one parameter of said direct current electrical energy decreases;

rectifier means for rectifying said second portion of said half cycles of alternating current electrical energy; and electrical energy storage means having a plurality of storage devices across said power-supply output for storing in different ones of said storage devices with additive polarity electrical charge from different second portions of the plurality of said half cycles of electrical energy to provide a potential for application to said power supply output, whereby a change in the amplitude of a series of said rectified second portions of said half cycles results in a related change in the potential provided by the storage means over a period of time required for storage of a plurality of half cycles;

said switching-means input terminal being electrically connected to the input of said power supply and said feedback input being electrically connected in series with said power supply output;

said rectifier means and said storage means being electrically connected between said switch means and said feedback input means, whereby the stability of said power supply is increased.

2. A power supply according to claim 1 in which said rectifier means includes a means for charging at least one of said storage devices with a half cycle of said alternating current electrical energy and an other storage device with the next successive half cycle of said alternating current energy, whereby said potential provided for application to said power supply output includes the additive potential of said one and said other storage devices formed from charge applied to said one storage device from a half cycle of one polarity and to said other storage device from a half cycle of the opposite polarity such that an increase in said potential provided to said power supply output due to a change in the power supply input is developed in two successive half steps corresponding in time to two successive half cycles of said alternating current electrical energy.

3. A power supply according to claim 1 including a voltage multiplier electrically connected in series between said switching means and said power supply output, said voltage multiplier comprising said rectifier means and said storage means, whereby said direct current electrical energy applied to said load may have a higher potential than the alternating half cycles of alternating electrical current energy applied to said power supply input.

4. A power supply according to claim 1 in which said switching means comprises a bidirectional semiconductor switching device.

5. A power supply according to claim 1 in which said power supply output comprises a series-pass output regulator having its input electrically connected to said feedback input and including power supply output terminals.

6. A power supply according to claim 5 in which said series-pass regulator comprises:

a transistor having first, second and third electrodes;

said first electrode comprising a base of said transistor;

one of said second and third electrodes comprising a collector for said transistor and the other of said second and third electrodes comprising the emitter of said transistor;

said second electrode being electrically connected to said feedback input, whereby said switching means is controlled to prevent excessive voltages from being applied to said second electrode so as to prevent damage to said transistor;

said series-pass regulator further including a filter and a series-pass feedback circuit;

said filter being connected between said third electrode and said power supply output terminals;

said series-pass feedback circuit being electrically connected between said first electrode and said filter.

7. A power supply according to claim 1 comprising a voltage quadrupler, said voltage quadrupler including said rectifier means and said storage means.

8. A power supply according to claim 7 in which:

said switching means comprises a thyristor having a first element electrically connected to said power supply input, a control element electrically connected to said feedback output and a second element electrically connected to said voltage quadrupler;

said rectifier means of said voltage quadrupler including first, second, third, and fourth diodes;

said second electrode of said thyristor being electrically connected to the anode of said first diode and the cathode of said second diode;

the anode of said second diode being connected to the cathode of said third diode and the cathode of said first diode being connected to the anode of said fourth diode;

said storage means of said voltage multiplier comprising first, second, third, and fourth capacitors;

said first capacitor having one plate electrically connected to said power supply input means and said second plate electrically connected to the cathode of said first diode and the anode of said fourth diode;

said second capacitor having one plate electrically connected to the cathode of said fourth diode and having its other plate electrically connected to the first plate of said third capacitor and to the anode of said first diode and to the cathode of said second diode;

said third capacitor having its first plate electrically connected to the second plate of said second capacitor and having its second plate electrically connected to the anode of said third diode;

said fourth capacitor having one plate electrically connected to the power supply input means and the other plate electrically connected to the anode of said second diode;

said second and third capacitors being electrically connected in series across the power supply output.

9. A power supply having a power-supply input adapted to receive a series of alternating half cycles of alternating current electrical energy and a power-supply output adapted to supply direct current electrical energy to a load, comprising:

switching means having a switching-means control terminal, a switching-means output terminal and a switching-means input terminal for blocking first portions and passing second portions of said alternating half cycles of alternating current electrical energy between said switching-means input terminal and said switching-means output terminal, for increasing the first portions and decreasing the second portions when a characteristic of a control signal applied to the switching means control terminal changes in a first direction and for decreasing the first portions and increasing the second portions when said characteristic changes in a second direction;

switching-control feedback means, having a feedback output electrically connected to said switching-means control terminal and having a feedback input, for causing said characteristic of said control signal to change in said first direction when one parameter of said direct current electrical energy at said feedback input increases and for causing said characteristic of said control signal to change in said second direction when said one parameter of said direct current electrical energy decreases;

rectifier means for rectifying said second portion of said half cycles of alternating current electrical energy; and electrical energy storage means having a plurality of storage devices across said power-supply output for storing in different ones of said storage devices with additive polarity electrical charge from different second portions of the plurality of said half cycles of electrical energy to provide a potential for application to said power supply output, whereby a change in the amplitude of a series of said rectified second portions of said half cycles results in a related change in the potential provided by the storage means over a period of time required for storage of a plurality of half cycles;

said switching-means input terminal being electrically connected to the input of said power supply and said feedback input being electrically connected in series with said power supply output;

said rectifier means and said storage means being electrically connected between said switch means and said feedback input means, whereby the stability of said power supply is increased;

said power supply output comprising a series-pass output regulator having its input electrically connected to said feedback input and including power supply output terminals;

said series-pass regulator comprising a transistor having first, second and third electrodes;

said first electrode comprising a base of said transistor;

one of said second and third electrodes comprising a collector for said transistor and the other of said second and third electrodes comprising the emitter of said transistor;

said second electrode being electrically connected to said feedback input, whereby said switching means is controlled to prevent excessive voltages from being applied to said second electrode so as to prevent damage to said transistor;

said series-pass regulator further including a filter and a series-pass feedback circuit;

said filter being connected between said third electrode and said power supply output terminals;

said series-pass feedback circuit being electrically connected between said first electrode and said filter;

said series-pass feedback circuit comprising an operational amplifier having an output terminal, a first input terminal, and a second input terminal;

the output terminal of said operational amplifier being electrically connected to said first electrode;

said series-pass feedback circuit further comprising an adjustable source of reference voltage;

said first input terminal of said operational amplifier being electrically connected to said adjustable source of reference voltage;

said series-pass feedback circuit further comprising a resistor having first and second ends;

said first end of said resistor being connected to the negative output terminal of said power supply;

said series-pass feedback circuit further comprising switch means for selectively electrically connecting said second input terminal of said operational amplifier to said filter means and said first input terminal of said operational amplifier to said second end of said resistor.

10 A power supply having a power-supply input adapted to receive a series of alternating half cycles of alternating current electrical energy and a power-supply output adapted to supply direct current electrical energy to a load, comprising:

switching means having a switching-means control terminal, a switching-means output terminal and a switching-means input terminal for blocking first portions and passing second portions of said alternating half cycles of alternating current electrical energy between said switching-means input terminal and said switching-means output terminal, for increasing the first portions and decreasing the second portions when a characteristic of a control signal applied to the switching means control terminal changes in a first direction and for decreasing the first portions and increasing the second portions when said characteristic changes in a second direction;

switching-control feedback means, having a feedback output electrically connected to said switching-means control terminal and having a feedback input, for causing said characteristic of said control signal to change in said first direction when one parameter of said direct current electrical energy at said feedback input increases and for causing said characteristic of said control signal to change in said second direction when said one parameter of said direct current electrical energy decreases;

recitifer means for rectifying said second portion of said half cycles of alternating current electrical energy; and electrical energy storage means having a plurality of storage devices across said power-supply output for storing in different ones of said storage devices with additive polarity electrical charge from different second portions of the plurality of said half cycles of electrical energy to provide a potential for application to said power supply output, whereby a change in the amplitude of a series of said rectified second portions of said half cycles results in a related change in the potential provided by the storage means over a period of time required for storage of a plurality of half cycles;

11. A power supply according to claim 10 in which said pulse amplifier includes:

a pulse transforer having a primary winding and a secondary winding;

said secondary winding being eectrically connected to said switching-means control terminal;

a self-actuated semiconductor switch having an input electrode and an output electrode;

an input amplifier stage having an input terminal electrically connected to said comparing-means output terminal and an output terminal electrically connected to the input electrode of said self-actuated semiconductor switch; and an output amplifier stage having an input electrically connected to the output electrode of said self-actuated semiconductor switch and an output electrically connected to the primary of said pulse transformer.

12. A method of changing alternating current electrical energy into direct current electrical energy, comprising the steps of:

applying said alternating electrical energy to a bidirectional switching means;

adjusting the bidirectional switching means to block a first portion of each half cycle and pass a second portion of each half cycle of said alternating current electrical energy;

rectifying the second portions of each cycle;

storing the charge from the rectified second portions of the cycles in capacitors with additive polarity to provide an output direct current potential that is the sum of the potentials imposed on the capacitors from different half cycles, whereby a change in the amplitude of the alternating current electrical energy results in a change in the charge stored in one capacitor during the time of a first half cycle and in another capacitor during the time of the second half cycle so that the changes in the amplitude of the alternating current electrical energy result in step by step changes in the resulting direct current potential;

comparing the output direct current potential to a reference potential and deriving a signal indicating the relationship of the output direct current potential to the reference potential; and applying said signal to the bidirectional switching means to adjust the portion of the half cycles that are blocked and the portion of the half cycles that are passed, whereby said bidirectional switching means regulates the electrical energy that is converted into direct current electrical energy.

13. A method according to caim 12 further comprising the steps of:

applying said direct current potential to a variable impedance;

applying the potential received from the variable impedance to the output terminals of a power supply;

comparing the output potential from the variable impedance with a reference potential;

deriving a second signal representing the relationship of the output potential from the variable impedance to the reference potential;

applying the second signal to the variable impedance and adjusting the impedance in relationship to the signal to regulate the output potential of the variable impedance.

14. A method in accordance with claim 12 in which the step of storing charge comprises the steps of:

applying first and second increments of charge to first and second capacitors respectively in a direction and an amount related to a change in the amplitude of the alternating current electrical energy during a first half cycle of the alternating current energy;

applying third and fourth increments of charge to third and fourth capacitors in the same direction and amount as the first and second increments were applied to said first and second capacitors during a half cycle of the alternating current energy;

adding the first increment of potential from the first increment of charge on the first capacitor to the direct current output during said first half cycle;

adding the second and third increments of potential from the second and third capacitors to the direct current output during the second half cycle; and adding the fourth increment of potential from the fourth capacitor to the direct current output during the third half cycle.

15. A method according to claim 12 in which the step of comparing said output direct potential with a reference potential comprises the steps of:

applying said output direct current potential across a potential divider;

applying a portion of said output direct current potential from said potential divider to a threshold switch; and applying the output from the threshold switch to said bidirectional switching means to control the phase angle at which said bidirectional switching means is fired.

* * * * *

UNITED STATES PATENT OFFICE
CERTIFICATE OF CORRECTION

Patent No. 3737758    Dated June 5, 1973

Inventor(s)  Robert W. Allington

It is certified that error appears in the above-identified patent and that said Letters Patent are hereby corrected as shown below:

In the drawings, in the upper left portion of the figure:

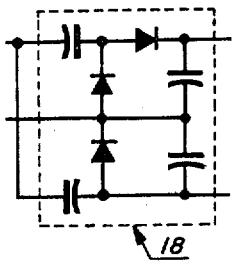

should be

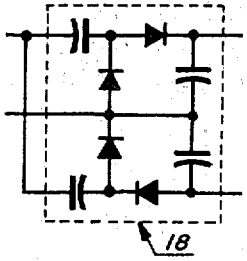

Signed and sealed this 18th day of December 1973.

(SEAL)
Attest:

EDWARD M. FLETCHER, JR.
Attesting Officer

RENE D. TEGTMEYER
Acting Commissioner of Patents